(12) United States Patent
Wu

(10) Patent No.: US 9,456,171 B1
(45) Date of Patent: Sep. 27, 2016

(54) TV DEMODULATOR CAPABLE OF CALIBRATING OUTPUT AND CALIBRATION METHOD THEREOF

(71) Applicant: PixArt Imaging Incorporation, HsinChu (TW)

(72) Inventor: Chia-Ming Wu, HsisnChu (TW)

(73) Assignee: PIXART IMAGING INCORPORATION, Hsinchu (TW)

( * ) Notice: Subject to any disclaimer, the term of this patent is extended or adjusted under 35 U.S.C. 154(b) by 0 days.

(21) Appl. No.: 14/960,251

(22) Filed: Dec. 4, 2015

(30) Foreign Application Priority Data

Mar. 18, 2015 (TW) .............................. 104108559 A

(51) Int. Cl.
*H04N 5/455* (2006.01)
*H04N 5/44* (2011.01)

(52) U.S. Cl.
CPC ..................................... *H04N 5/455* (2013.01)

(58) Field of Classification Search
CPC ........................... H04N 21/4382; H04N 5/455
USPC .............. 348/726, 725, 720, 553, 571, 507; 375/324, 328; 329/367, 361
See application file for complete search history.

(56) References Cited

U.S. PATENT DOCUMENTS

| | | | |
|---|---|---|---|
| 4,544,911 A | 10/1985 | Altman et al. | |
| 7,352,238 B2 | 4/2008 | Elwan et al. | |
| 8,363,169 B2* | 1/2013 | Wei .................... | H04N 21/4382 348/726 |
| 8,767,129 B2 | 7/2014 | Wei et al. | |
| 2014/0055676 A1* | 2/2014 | Matsumoto ........... | H03M 3/458 348/572 |

* cited by examiner

*Primary Examiner* — Brian Yenke
*Assistant Examiner* — Jean W Desir
(74) *Attorney, Agent, or Firm* — Tung & Associates

(57) ABSTRACT

The present invention provides a TV demodulator, which includes a TV digital-to-analog converter (TV DAC) and a calibration circuit. The TV DAC includes: a master control switch controlled by a calibration signal to generate a master current; a current distribution circuit distributing the master current to generate an analog output signal at an output terminal; a first switch electrically connected between the current distribution circuit and a first resistor; and a second switch electrically connected between the current distribution circuit and a second resistor. The calibration circuit generates the calibration signal according to the analog output signal, to feedback control the master current.

9 Claims, 3 Drawing Sheets

TV DEMODULATOR CAPABLE OF CALIBRATING OUTPUT AND CALIBRATION METHOD THEREOF

CROSS REFERENCE

The present invention claims priority to TW 104108559, filed on Mar. 18, 2015.

BACKGROUND OF THE INVENTION

1. Field of Invention

The present invention relates to a TV (television) demodulator capable of calibrating its output and a calibration method thereof; particularly, it relates to such a TV demodulator capable of generating an accurate output signal under a situation where a resistance of a TV transmission wire is unknown, and a calibration method thereof.

2. Description of Related Art

In a conventional TV demodulator, the output signal is often affected by the resistance of the back-end circuit connected to the output of the TV demodulator. In order to generate an accurate output signal, the prior art adopts external add-on resistors, to match with a resistance of a TV transmission wire which is connected to the output of the TV demodulator.

Nevertheless, because the resistance of the TV transmission wire is unknown, the add-on resistors may not always match with the resistance of the TV transmission wire, thus failing to generate the desired accurate output signal. As a consequence, an issue such as that the color level cannot be full level, or other problems, may arise.

The following patents disclose contents which are related to the present invention: U.S. Pat. No. 8,767,129, U.S. Pat. No. 7,352,238 and U.S. Pat. No. 4,544,911.

In view of the above, to overcome the drawbacks in the prior art, the present invention proposes a TV demodulator capable of calibrating its output, and a calibration method thereof. The TV demodulator is capable of generating an accurate output signal under a situation where a value of the resistance of the TV transmission wire is unknown. Besides, the present invention provides two operation modes: a high quality mode and a low power consumption mode, which increases the flexibility in application.

SUMMARY OF THE INVENTION

From one perspective, the present invention provides a TV demodulator capable of calibrating output, comprising: a TV digital-to-analog converter (TV DAC), which includes: a master control switch having one end coupled to a predetermined voltage level, the master control switch being controlled by a calibration signal, wherein when the calibration signal turns ON the master control switch, a master current is generated; a current distribution circuit coupled to the master control switch, the current distribution circuit distributing the master current according to an image control signal, so as to generate an analog output signal at an output terminal of the TV demodulator; a first switch and a first resistor coupled to each other in series, wherein the first switch is coupled to the current distribution circuit and the output terminal; and a second switch and a second resistor coupled to each other in series, wherein the second switch is coupled to the current distribution circuit; and a calibration circuit coupled to the output terminal and the master control switch, wherein the calibration circuit generates the calibration signal for controlling the master control switch according to the analog output signal, so as to feedback control the master current.

In one embodiment, under a voltage output mode, the first switch and the second switch are both ON, whereby the TV demodulator provides the analog output signal in a voltage form which has been calibrated.

In one embodiment, under a current transmission mode, the first switch and the second switch are both OFF, whereby the TV demodulator provides the analog output signal in a current form.

In one embodiment, the calibration circuit includes: a comparator for comparing the analog output signal or a signal related to the analog output signal with a reference voltage, to generate a comparison result; and a control circuit for generating the calibration signal according to the comparison result.

In one embodiment, the calibration circuit includes: an error amplifier for comparing the analog output signal or a signal related to the analog output signal with a reference voltage, to generate the calibration signal.

In one embodiment, the TV DAC and the calibration circuit are integrated into one single integration circuit, and the first resistor and the second resistor are both integrated inside the integration circuit.

From another perspective, the present invention provides a calibration method for a TV demodulator, comprising the steps of: (A) providing a TV digital-to-analog converter (TV DAC), wherein the TV DAC distributes a master current via a current distribution circuit, to determine an analog output signal; (B) providing a first switch and a first resistor, which are coupled to each other in series, wherein the first switch is coupled to the current distribution circuit and the output terminal; (C) providing a second switch and a second resistor, which are coupled to each other in series, wherein the second switch is coupled to the current distribution circuit; and (D) feedback controlling the master current according to the analog output signal.

The objectives, technical details, features, and effects of the present invention will be better understood with regard to the detailed description of the embodiments below, with reference to the attached drawings.

DESCRIPTION OF THE PREFERRED EMBODIMENTS

The above and other technical details, features and effects of the present invention will be will be better understood with regard to the detailed description of the embodiments below, with reference to the drawings. The drawings as referred to throughout the description of the present invention are for illustration only, to show the interrelations between the apparatus and devices, but not drawn according to actual scale.

Figure 1:
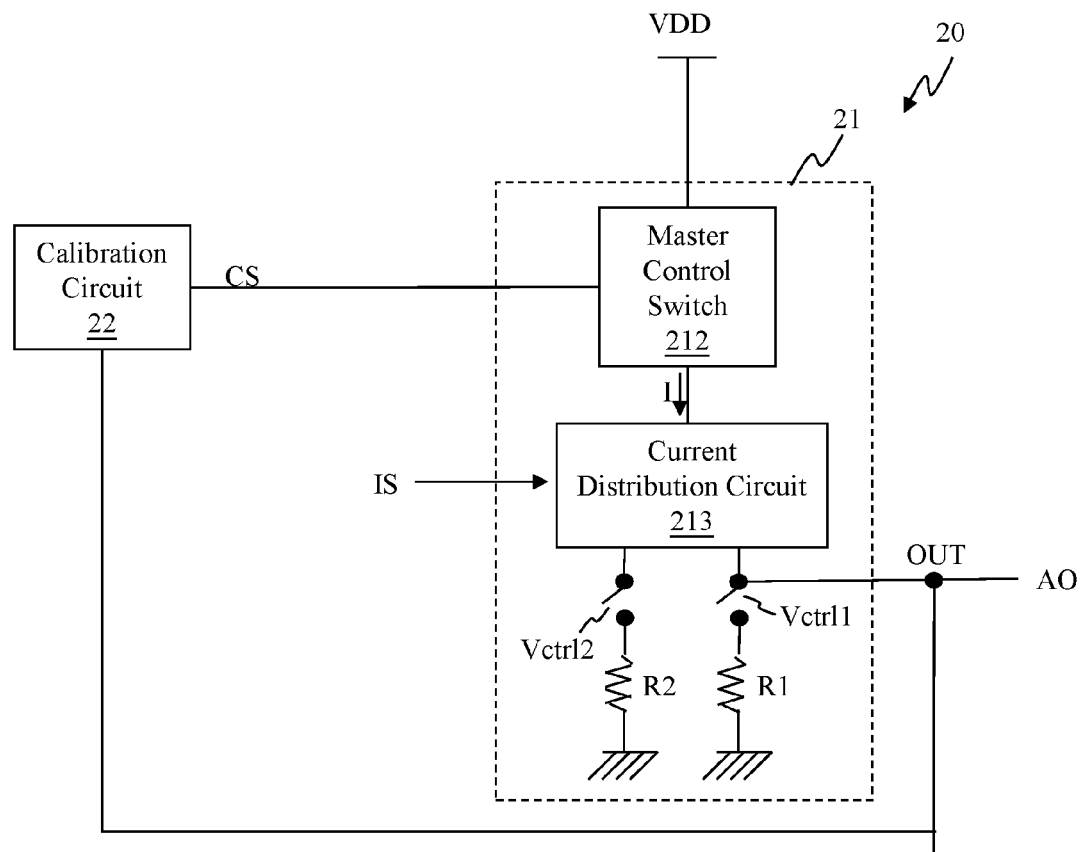
FIG. 1 shows a block diagram of a TV demodulator capable of calibrating output according to an embodiment of the present invention.

Please refer to FIG. 1, which shows a block diagram of a TV demodulator capable of calibrating output according to an embodiment of the present invention. The TV demodulator 20 capable of calibrating output of this embodiment comprises a TV digital-to-analog converter (TV DAC) 21 and a calibration circuit 22. The calibration circuit 22 generates a calibration signal CS according to the analog output signal AO ("according to the analog output signal AO" can be directly or indirectly, i.e., the calibration circuit 22 can generate the calibration signal CS according to the analog output signal AO itself, or according to a signal that is related to the analog output signal AO. For example, when the analog output signal AO is a voltage signal, in one embodiment, the "signal related to the analog output signal AO" can be a divided voltage of the analog output signal AO, and when the analog output signal AO is a current signal, in one embodiment, the "signal related to the analog output signal AO" can be a voltage signal converted from the analog output signal AO; i.e., the "signal related to the analog output signal AO" is a signal which is generated from the analog output signal AO and has a known relationship with the analog output signal AO). The calibration signal CS controls whether the TV DAC 21 generates the analog output signal AO, and calibrates the analog output signal AO generated by the TV DAC 21. When the calibration signal CS enables the TV DAC 21 to generate the analog output signal AO, the TV DAC 21 is controlled by the image control signal IS, so as to generate the analog output signal AO at an output terminal OUT of the TV demodulator 20. The image control signal IS can be a multibit signal, wherein a higher number of bits provide a higher resolution (i.e., the analog output signal AO can have more levels of variations). The output terminal OUT can be connected to, for example but not limited to, a TV display. The TV display for example can be a digital TV (DTV) or a conventional analog TV (ATV).

More specifically, the TV DAC 21 includes a master control switch 212, a current distribution circuit 213, a first switch Vctrl1 and a switch Vctrl2. The master control switch 212 is coupled to a predetermined voltage level, for example but not limited to, a positive power supply VDD. The master control switch 212 is controlled by the calibration signal CS. When the master control switch 212 is turned ON by the calibration signal CS, a master current I is generated. The current distribution circuit 213 is coupled to the master control switch 212 and is controlled by an image control signal IS. The current distribution circuit 213 distributes the master current I (i.e., determines the analog output signal AO) according to the image control signal IS. The current distribution circuit 213 is electrically connected to the first resistor R1 through the first switch Vctrl1. The other end of the first resistor R1, which is not electrically connected to the first switch Vctrl1, is connected to a known voltage level, such as a ground level. The first switch Vctrl1 is coupled to the output terminal OUT. Also, the current distribution circuit 213 is electrically connected to the second resistor R2 through the second switch Vctrl1. The other end of the second resistor R2, which is not electrically connected to the second switch Vctrl2, is connected to a known voltage level, such as a ground level. In one embodiment, the TV DAC 21 and the calibration circuit 22 are integrated into one single integration circuit, and the first resistor R1 and the second resistor R2 are both integrated inside the integration circuit.

In the present invention, because the master control switch 212 is controlled by the calibration signal CS, the level of the master current I can be controlled. That is, the master current I can be feedback controlled according to the analog output signal AO, whereby the analog output signal AO is regulated at an accurate value.

Figure 2:
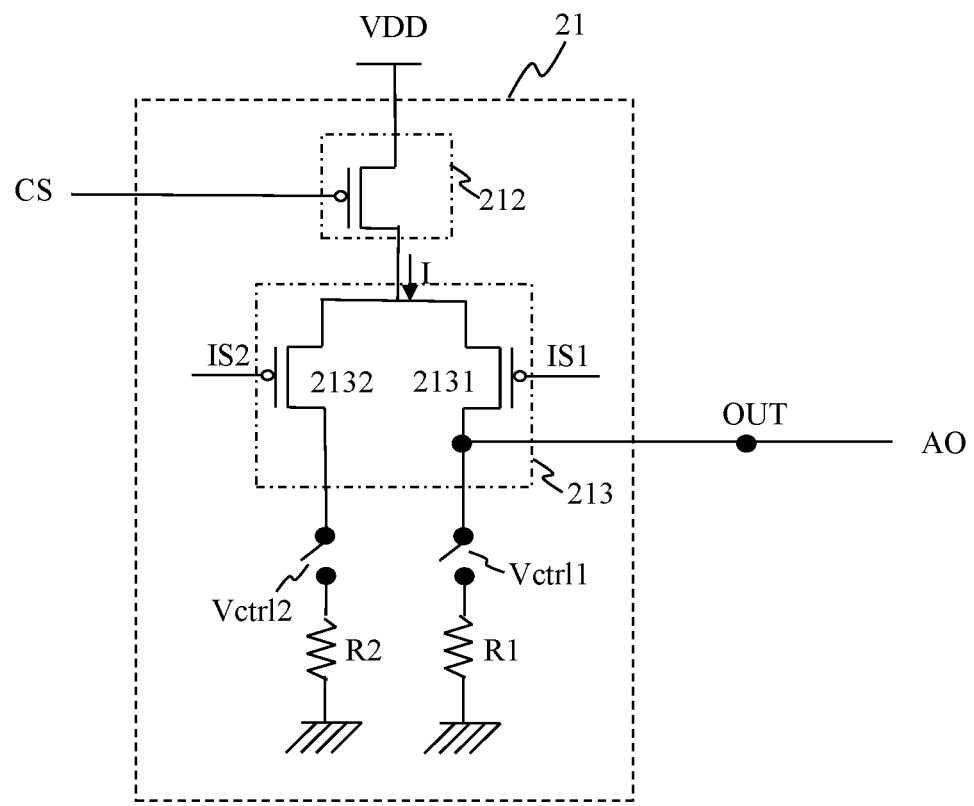
FIG. 2 shows a specific embodiment of a TV digital-to-analog converter (TV DAC) of the present invention.
Figure 4:
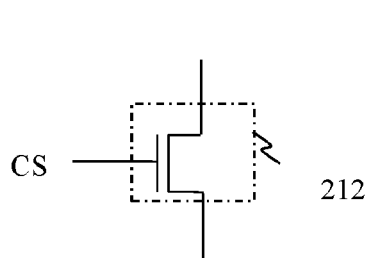
FIG. 4 shows another embodiment of a master control switch of the present invention.
Figure 5:
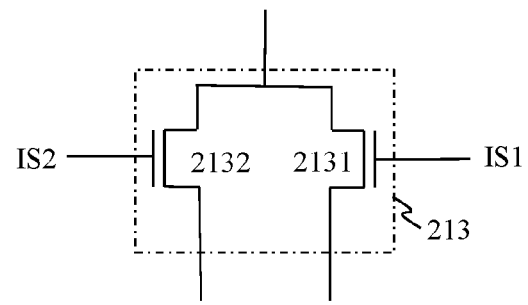
FIG. 5 shows another embodiment of a first current distribution switch and a second current distribution switch of the present invention.

Please refer to FIG. 2, which shows a specific embodiment of a TV digital-to-analog converter (TV DAC) of the present invention. In this embodiment, the master control switch 212 is for example but not limited to a PMOS power transistor switch, as shown in FIG. 2. In another embodiment, the master control switch 212 can be an NMOS power transistor switch, as shown in FIG. 4. In this embodiment, the current distribution circuit 213 includes a first current distribution switch 2131 and a second current distribution switch 2132, which are connected to each other in parallel. In this embodiment, the first current distribution switch 2131 and the second current distribution switch 2132 for example can both be PMOS power transistor switches, as shown in FIG. 2. In another embodiment, the first current distribution switch 2131 and the second current distribution switch 2132 for example can both be NMOS power transistor switches, as shown in FIG. 5. In this embodiment, the image control signal IS includes sub-signals IS1 and IS2, for respectively controlling the first current distribution switch 2131 and the second current distribution switch 2132. The sub-signal IS1 and the sub-signal IS2 are complementary to each other.

Figure 3A:
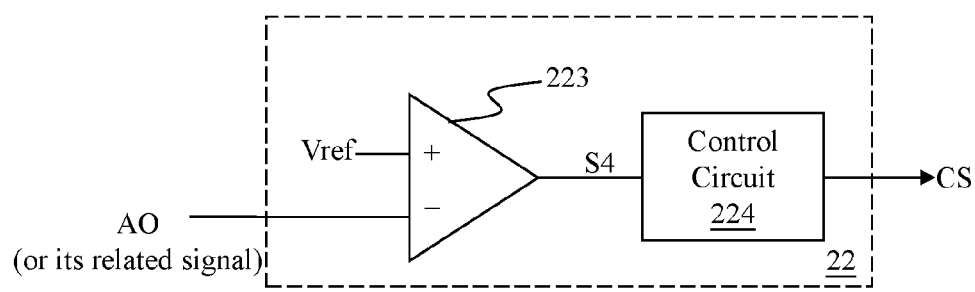
FIG. 3A shows an embodiment of a calibration circuit of the present invention.
Figure 3B:
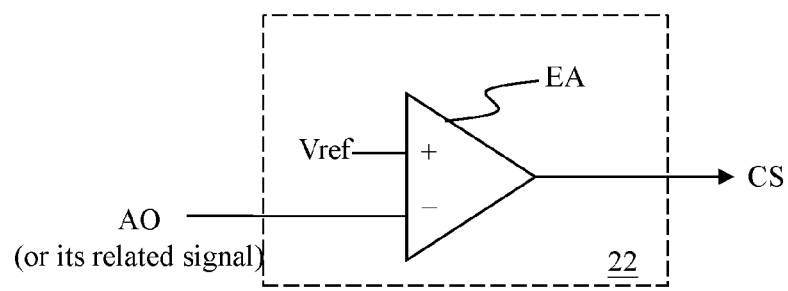
FIG. 3B shows another embodiment of a calibration circuit of the present invention.

Please refer to FIG. 3A and FIG. 3B. FIG. 3A shows an embodiment of a calibration circuit of the present invention. FIG. 3B shows another embodiment of a calibration circuit of the present invention.

As shown in FIG. 3A, in one embodiment, the calibration circuit 22 includes a comparator 223 and a control circuit 224. One input terminal of the comparator 223 receives the analog output signal AO or a signal related to the analog output signal AO (e.g., when the analog output signal AO is a voltage signal, in one embodiment, the "signal related to the analog output signal AO" can be a divided voltage of the analog output signal AO, and when the analog output signal AO is a current signal, in one embodiment, the "signal related to the analog output signal AO" can be a voltage signal converted from the analog output signal AO; i.e., the "signal related to the analog output signal AO" is a signal which is generated from the analog output signal AO and has a known relationship with the analog output signal AO), while another input terminal of the comparator 223 receives a reference voltage Vref. The output terminal of the comparator 223 is coupled to the control circuit 224. The control circuit 224 generates the calibration signal CS according to an output signal S4 of the comparator 223. When the level of the analog output signal AO is too low, the calibration signal CS controls the master control switch 212 to increase the master current I. When the level of the analog output signal AO is too high, the calibration signal CS controls the master control switch 212 to decrease the master current I. As a result, through the mechanism of feedback control, the analog output signal AO can be regulated at a desired level, corresponding to the reference voltage Vref. The reference voltage Vref can be an adjustable value.

As shown in FIG. 3B, in another embodiment, the calibration circuit 22 can include just an error amplifier EA. One input terminal of the error amplifier EA receives the analog output signal AO or a signal related to the analog output signal AO, while another input terminal of the error amplifier EA receives a reference voltage Vref. The error amplifier EA compares the analog output signal AO or a signal related to the analog output signal AO with the reference voltage Vref, so as to generate the control signal CS for controlling the operation of the master control switch 212. When the level of the analog output signal AO is too low, the calibration signal CS controls the master control switch 212 to increase the master current I. When the level of the analog output signal AO is too high, the calibration signal CS controls the master control switch 212 to decrease the master current I. As a result, through the mechanism of feedback control, the analog output signal AO can be regulated at a desired level, corresponding to the reference voltage Vref. The reference voltage Vref can be an adjustable value.

The present invention can operate under different modes by controlling the first switch Vctrl1 and the second switch Vctrl2. In one embodiment, the first switch and the second switch are both ON, whereby the TV demodulator 20 operates under a voltage output mode. In this mode, referring to FIG. 2, the analog output signal AO is a voltage signal, which is equal to a product of a current flowing through the resistor R1 multiplied by the resistor R1. Under such voltage output mode, the present invention can provide an accurate analog output signal AO.

In another embodiment, the first switch and the second switch are both OFF, whereby the TV demodulator 20 operates under a current transmission mode. In this mode, referring to FIG. 2, the analog output signal AO is a current signal whose value is determined according to the sub-signals IS1 and IS2. This current transmission mode is applicable, for example, when a back-end circuit receiving the analog output signal AO does not require an accurate signal or it can perform self-calibration. Under such current transmission mode, the present invention provides an effect of low power consumption. In the prior art which adopts external add-on resistors, there are no first switch Vctrl1 and second switch Vctrl2. Consequently, there are currents flowing through the resistors R1 and R2, unnecessarily consuming power. In the present invention, because the first switch and the second switch are turned OFF, no current flows through the resistors R1 and R2, so the power consumption is reduced. Experiment data shows that the present invention can save 50% of the power consumption.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, a device which does not substantially influence the primary function of a signal can be inserted between any two devices in the shown embodiments, such as a switch. For another example, the positive and negative input terminals of an error amplifier circuit or a comparator are interchangeable, with corresponding amendments of the circuits processing these signals. In view of the foregoing, the spirit of the present invention should cover all such and other modifications and variations, which should be interpreted to fall within the scope of the following claims and their equivalents.

What is claimed is:

1. A TV demodulator capable of calibrating output, comprising:
    a TV digital-to-analog converter (TV DAC), which includes:
        a master control switch having one end coupled to a predetermined voltage level, the master control switch being controlled by a calibration signal, wherein when the calibration signal turns ON the master control switch, a master current is generated;
        a current distribution circuit coupled to the master control switch, the current distribution circuit distributing the master current according to an image control signal, so as to generate an analog output signal at an output terminal of the TV demodulator;
        a first switch and a first resistor coupled to each other in series, wherein the first switch is coupled to the current distribution circuit and the output terminal; and
        a second switch and a second resistor coupled to each other in series, wherein the second switch is coupled to the current distribution circuit; and
    a calibration circuit coupled to the output terminal and the master control switch, wherein the calibration circuit generates the calibration signal for controlling the master control switch according to the analog output signal, so as to feedback control the master current.

2. The TV demodulator capable of calibrating output of claim 1, wherein under a voltage output mode, the first switch and the second switch are both ON, whereby the TV demodulator provides the analog output signal in a voltage form which has been calibrated.

3. The TV demodulator capable of calibrating output of claim 1, wherein under a current transmission mode, the first switch and the second switch are both OFF, whereby the TV demodulator provides the analog output signal in a current form.

4. The TV demodulator capable of calibrating output of claim 1, wherein the calibration circuit includes:
    a comparator for comparing the analog output signal or a signal related to the analog output signal with a reference voltage, to generate a comparison result; and
    a control circuit for generating the calibration signal according to the comparison result.

5. The TV demodulator capable of calibrating output of claim 1, wherein the calibration circuit includes:
    an error amplifier for comparing the analog output signal or a signal related to the analog output signal with a reference voltage, to generate the calibration signal.

6. The TV demodulator capable of calibrating output of claim 1, wherein the TV DAC and the calibration circuit are integrated into one single integration circuit, and the first resistor and the second resistor are both integrated inside the integration circuit.

7. A calibration method for a TV demodulator, comprising the steps of:
    (A) providing a TV digital-to-analog converter (TV DAC), wherein the TV DAC distributes a master current via a current distribution circuit, to determine an analog output signal;
    (B) providing a first switch and a first resistor, which are coupled to each other in series, wherein the first switch is coupled to the current distribution circuit and the output terminal;
    (C) providing a second switch and a second resistor, which are coupled to each other in series, wherein the second switch is coupled to the current distribution circuit; and
    (D) feedback controlling the master current according to the analog output signal.

8. The calibration method of claim 7, wherein, under a voltage output mode, the first switch and the second switch are both ON so that the TV demodulator provides the analog output signal in a voltage form which has been calibrated.

9. The calibration method of claim 7, wherein, under a current transmission mode, the first switch and the second switch are both OFF so that the TV demodulator provides the analog output signal in a current form.

* * * * *